March 29, 1960 E. D. HOWELL ET AL 2,930,597
ELECTRIC FOOD MIXER AND SPEED CONTROL MECHANISM
Filed July 26, 1956 2 Sheets-Sheet 1

Inventors
Edward D. Howell
Robert P. Farrell Jr.
by Lawrence R. Kempton
Their Attorney March 29, 1960 E. D. HOWELL ET AL 2,930,597
ELECTRIC FOOD MIXER AND SPEED CONTROL MECHANISM
Filed July 26, 1956 2 Sheets-Sheet 2
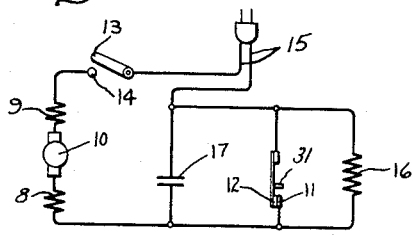
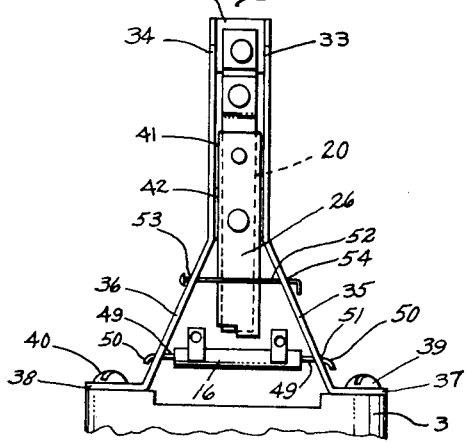
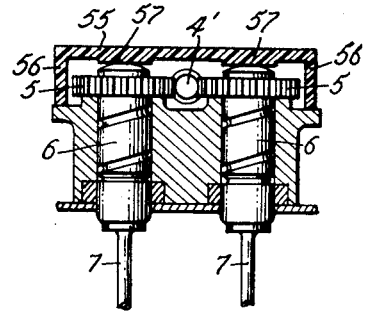
Inventors:
Edward D. Howell
Robert P. Farrell Jr.
by Laurence R. Templeton
Their Attorney United States Patent Office 2,930,597
Patented Mar. 29, 1960

2,930,597

ELECTRIC FOOD MIXER AND SPEED CONTROL MECHANISM

Edward D. Howell, Brockport, N.Y., and Robert P. Farrell, Jr., Louisville, Ky., assignors to General Electric Company, a corporation of New York Application July 26, 1956, Serial No. 600,194

15 Claims. (Cl. 259—131)

This invention relates to household mixing devices, and more particularly, to speed control mechanisms for controlling the speed of a household food mixer and to the combination of a food mixer beater spindle gear case cover and a speed control mechanism.

In electric kitchen mixers and the like, one or more beaters are mechanically connected to a small electric motor by which they are rotated to mix or beat foodstuffs, and it is desirable to be able to vary the speed of the beaters to suit the requirements of the material being mixed. Although this speed control may be accomplished in various ways, one preferred manner has been to employ a centrifugal governor which opens a pair of normally closed circuit-breaking contacts connected serially in the motor supply circuit upon the motor reaching the desired speed. A manually movable mechanism is provided for adjusting the speed setting of the governor. This invention is concerned with such a speed control arrangement.

Accordingly, it is an object of this invention to provide an improved adjustable mechanism for controlling the speed of a household food mixer which is simple in structure, light in weight, and capable of being manufactured and embodied in the mixer at low cost.

It is a further object of this invention to provide an improved single lever arrangement for adjusting the governor speed setting, and for operating the motor "On" and "Off" switch.

A still further object of the present invention is to simplify the construction of a household mixer by providing a unique relationship between a gear case cover for enclosing the mixer beater spindle gears and an improved governor adjusting mechanism.

In accordance with one aspect of this invention, an improved adjustable speed governor for controlling the speed of a household mixer is mounted at the rear end of the mixer, a control rod having two ends extends from the front end of the mixer to the rear end of the mixer. One end of the rod is connected to the governor for adjusting the speed setting thereof. The other end of the rod has a downwardly extending lug which is received by a longitudinal groove formed in a platform located at the front end of the mixer. A rotatable disc cam is positioned at the front end of the mixer for moving the lug in the groove. Thus, rotation of the disc cam adjusts the longitudinal position of the lug and rod to thereby adjust the governor speed setting.

In accordance with a further aspect of this invention, the platform which is provided with the groove for receiving the governor adjusting rod, referred to above, is ingeniously designed as part of a gear case cover for enclosing the beater spindle gears. The gear case includes the platform and depending side portions. A surface is formed on the under-side of the platform for abutting the ends of the beater spindles to form a thrust bearing for the spindles to thereby restrict upward movement thereof. Thus, a uniquely designed case functions as a gear cover, a guide for a governor adjusting rod, and a thrust bearing for the mixer beater spindles.

In accordance with a still further aspect of this invention, the improved adjustable speed governor includes a unique inverted Y-shaped supporting means for mounting an improved governor switch structure. A movable switch blade is connected at one end thereof to the straight vertical portion of the Y-shaped supporting means. The other end of the switch blade extends downwardly between the two outwardly extending arms of the Y. A pair of governor circuit breaking contacts for controlling the electrical energy supplied to the motor are provided. One of the contacts is fixed to the vertical arm of the Y-shaped supporting means and the other contact is fixed to the movable switch blade. Spring means is connected to the switch blade for biasing the contacts to a closed position. Means responsive to the speed of the mixer motor is positioned between the two outwardly extending arms of the Y and abuts the depending end of the movable switch blade. By this arrangement, a very simple yet effective governor switch support is achieved.

Further objects and advantages of this invention as well as other modifications and uses thereof will become apparent as the description proceeds. This invention will be better understood by reference to the accompanying drawings in which:

Fig. 6 is a schematic diagram of a circuit which may be used with the improved speed control mechanism of this invention;

Fig. 7 is an end view of the improved inverted Y-shaped supporting means; and

Fig. 8 is a sectional view taken substantially on line 8—8 of Fig. 1.

Figure 1:
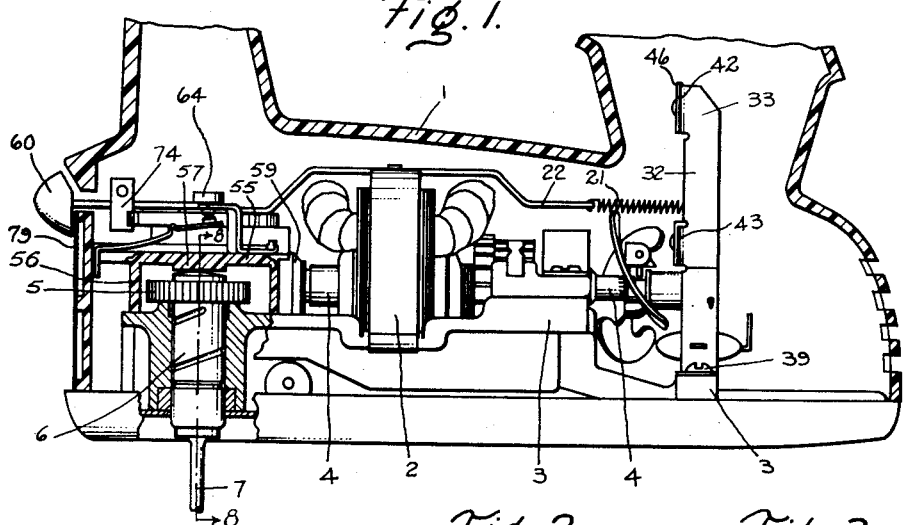
Fig. 1 is a side elevational view partially in cross section of a food mixer embodying the invention.

Referring now to Fig. 1, there is shown an electric kitchen mixer 1 comprising an electric motor 2 mounted on a base 3. The motor 2 includes an armature shaft 4 which has one end thereof formed as a worm gear 4' for driving a pair of gears 5. Gears 5 are connected to a pair of parallel spaced spindles 6 for driving a pair of mixer beater elements 7 in a conventional manner (see Fig. 8).

The motor is energized through a circuit such as shown in Fig. 6, the motor being schematically illustrated therein as series field windings 8 and 9 and armature 10. In the circuit the motor is connected serially with a pair of speed regulating governor contacts 11 and 12 and a pair of line switch contacts 13 and 14 across a power supply 15. Contacts 13 and 14 form the motor "On" and "Off" switch. Although the opening of contacts 13 and 14 completely de-energizes the motor, an impedance consisting of a parallelly connected resistor 16 and capacitor 17 is placed across contacts 11 and 12 so that their opening independently while line switch contacts 13 and 14 remain closed does not completely de-energize the motor. Contacts 11 and 12 place impedance 16 and 17 in the motor supply circuit or take this impedance out of the motor supply circuit. This is a well known mixer motor circuit.

Figure 2:
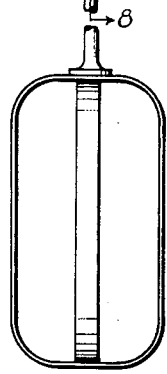
Fig. 2 is a side elevational view partially in cross section of the governor showing the contacts in an open position.
Figure 2:
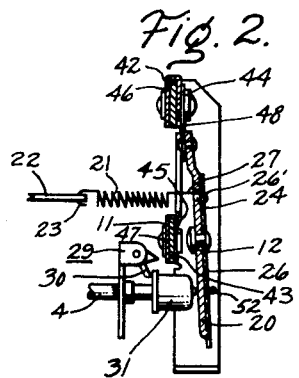
Figure 3:
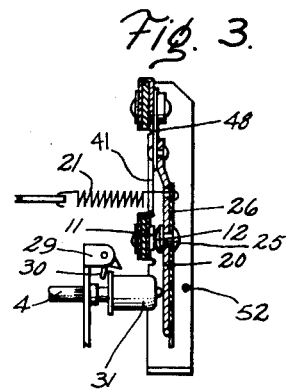
Fig. 3 is a side elevational view of the governor mechanism showing the contacts in a closed position.

The physical arrangement of the governor contacts is illustrated in Figs. 2, 3 and 7. Contact 12 is movable and is supported on a flat switch blade 20. Contact 11 is stationary. Contacts 11 and 12 are opened or closed in accordance with the relative value of two opposed forces acting on switch blade 20. One force tending to retain the contacts closed may be supplied by a governor speeder spring 21 which may be actuated by the improved governor spring adjusting mechanism including a rod 22 having a hole 23 formed in one end thereof for receiving one of the ends of the speeder spring 21. The other end 27 of speeder spring 21 is connected to switch blade 20. A rivet 25 or other suitable securing means which connects contact 12 to switch blade 20 may also connect a switch blade insulating plate 26 to the rear surface of switch blade 20. End portion 27 of the governor speeder spring may be passed through a small hole 24 formed in blade 20 and a slightly smaller hole 26' formed in plate 26 and bent to abut the back of plate 26 so that it does not ground the electrical circuit. An imposing force on the bottom of switch blade 20 tending to open the contacts is provided by a speed responsive device 29 fixed to shaft 4. The speed responsive device may comprise centrifugal flyweights 30 for urging a cup-shaped cap member 31 preferably formed of insulating material against the bottom side surface of switch blade 20. When the force of the speed responsive device 29 on switch blade 20 at the point of attachment of spring 21 to switch blade 20 becomes less than that of spring 21, contact 12 again closes on contact 11, thus effectively taking resistance 16 and capacitor 17 out of the motor supply circuit to allow the motor to increase speed. Hence, the relative value of the two forces is used to regulate the speed of motor shaft 4 at a substantially constant predetermined value. This predetermined value of the speed of shaft 4 is set by the improved governor speeder spring adjusting mechanism to increase or decrease the tension of speeder spring 21. The improved speeder spring adjusting mechanism will be more particularly described hereinafter.

A uniquely designed inverted Y-shaped supporting means for mounting the improved governor switch structure is provided. In spite of the inexpensiveness and simplicity of this supporting means, it has proven to be very rigid and effective. In the arrangement illustrated in Figs. 1 and 7, a single piece of material may be suitably formed and stamped to provide an upstanding vertical portion 32 having rearwardly bent side portions 33 and 34. Extensions of side portions 33 and 34 form two outwardly extending arms 35 and 36 of the Y. Outwardly extending arms 35 and 36 are flared horizontally outward at 37 and 38, respectively, to permit screws 39 and 40, respectively, or other suitable securing means to fix the Y-shaped support to motor support 3. The transverse portion of the vertical arm 32 is provided with an enlarged opening 41 to allow end portion 27 of the speeder spring 21 to extend therethrough and for forming upper and lower flat portions 42 and 43 for receiving terminals 44 and 45 of switch contacts 12 and 11, respectively. Insulating strips 46 and 47 are preferably placed between switch terminals 44 and 45, and flat portions 42 and 43, respectively, to prevent these terminals from being grounded through the Y-shaped yoke support. Insulated plate 26 is formed wider than switch blade 20 and thus guides blade 20 between side portions 33 and 34 so that the blade does not ground the electrical circuit. A conducting hinge 48 which may be formed from a very thin sheet of copper or other suitable conducting material connects movable switch blade 20 to terminal 42.

Arms 35 and 36 of the Y-shaped support are spread apart to increase the dimension of the base of the support to thereby increase the rigidity of the support, as well as for receiving and securely supporting resistor 16. To this end, resistor 16 is mounted on a plate 49 having outwardly extending supporting lugs 50. Arms 35 and 36 of the yoke are provided with slots 51 for receiving lugs 50. Thus, before the Y-shaped support sub-assembly is connected to motor support 3, resistor 16 may be conveniently snapped into place between the supporting arms 35 and 36 of the Y-shaped support.

As a further refinement, exceedingly simple stop means may be provided for limiting the rearward movement of switch blade 20. In the arrangement illustrated in Fig. 7, a simple transverse rod 52 which extends between outwardly extending arms 35 and 36 is provided for abutting the end of insulated plate 26 in the event of an extreme overspeed condition. This rod may take the form of a simple straight pin. It may be threaded through suitable holes 53 and 54 formed in outwardly extending arms 36 and 35, respectively, and then bent at the pointed end thereof to prevent removal. Thus, exceedingly compact and simple switch supporting means capable of sub-assembly is provided for carrying switch 11, 12, conducting hinge 48, resistor 16, stop 52 for the switch blade, and switch terminals 44 and 45, thereby greatly reducing the manufacturing cost of a mixer without sacrificing quality.

Figure 4:
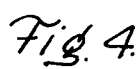
Fig. 4 is an exploded view of the improved governor adjusting mechanism and the motor "On" and "Off" switch.
Figure 4:
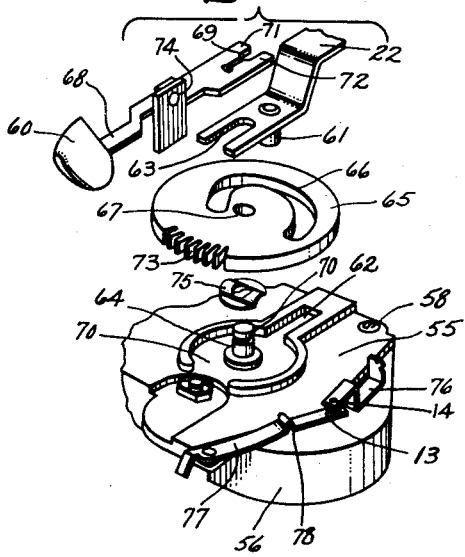

A new and improved cover which functions as a gear case for the mixer beater shaft gears, a grease retainer, a thrust bearing for the mixer beater spindles, a guide and support for the governor adjusting mechanism, a bearing cap for the forward motor shaft bearing, and an insulated support for the motor line switch 13, 14 is provided. The cover is preferably formed of plastic or other suitable insulating material and is therefore both light in weight and inexpensive. As best shown in Figs. 1 and 4, the cover comprises a generally horizontal top platform 55 and downwardly extending side portions 56 for enclosing the beater shaft gears 5. A transverse projection 57 is formed on the inside of top platform 55 and is provided with a surface for abutting the ends of mixer beater spindles 6, one of which tries to rise under load conditions. The thrust is in opposite directions for the two gears so projection 57 provides load thrust for one spindle and idle thrust for the other. Hence, this projection 57 functions as a thrust bearing for mixer beater spindles 6. Cover 55, 56 may be fixed to the mixer supporting structure 3 by suitable screws 58 or other suitable securing means. The rear end of cover 55, 56 functions as bearing cap for restricting upward movement of a forward bearing 59 for the motor armature shaft 4. A suitable grease for lubricating the gears and bearing surfaces may be placed within cover 5 and retained by this cover. The top platform 55 of the improved case 55, 56 constitutes an important part of the improved governor adjusting mechanism and motor line switch and will, therefore, be described in connection therewith.

A new and improved governor speeder spring adjusting mechanism and a motor line switch actuator which may be operated by a single manually movable knob 60 located at the forward end of the mixer where it is readily accessible is provided. As illustrated more particularly in Fig. 4, control rod 22 is provided with a downwardly extending lug 61 which may be inserted in a longitudinal groove 62 formed in platform 55. A slot 63 is also formed in control rod 22 adjacent to lug 61 for receiving a pivot pin 64 which is fixed to the upper platform 55 of the gear case. Pivot pin 64 is substantially centrally located on platform 55 and extends generally parallel to mixer beater spindles 6. Thus, pivot pin 64 co-operates with the slot 63 and lug 61 co-operates with groove 62 to guide control rod 22 for longitudinal movement with respect to the mixer.

A speed cam 65 is provided between control rod 22 and platform 55 for adjusting the position of control rod 22. In the arrangement illustrated, cam 65 comprises a substantially flat circular disc having a spiral slot 66 formed therethrough for receiving and positioning lug 61 to thereby position rod 22. A hole 67 is centrally located in cam 65 for receiving pivot pin 64. Thus, rotation of cam 65 about pivot pin 64 adjusts the position of spiral slot 66 to move lug 61 toward or away from pin 64 to thereby adjust the longitudinal position of rod 22 and the tension of the governor spring 21. Cam 65 is unencumbered with projecting portions that must withstand large loads and hence, may be formed of lightweight plastic. It is to be understood that this improved governor adjusting mechanism may be utilized to adjust various known types of governors and that rod 22 may not necessarily be connected to a speeder spring. For example, rod 22 may be utilized to position a movable governor contact with respect to a condition responsive governor contact.

A unique mechanism is provided for retaining cam 65 and rod 22 in position on pivot pin 64 and for actuating cam 65. As more particularly shown in Fig. 4, pivot pin 64 is provided with a circumferential groove 70 at the top portion thereof. A manually movable arm 68 is provided with a U-shaped slot 69 to form spring fingers 71 and 72 for receiving the reduced diameter portion of pivot pin 64 in the vicinity of circumferential groove 70. Speed cam 65 is provided with a plurality of radially extending circumferentially arranged speed adjusting notches 73 formed on the outer circumference thereof. A vertical plate 74 which may be formed of insulated material for a purpose to be more fully explained hereinafter is fixed to an intermediate portion of arm 68. Spring arms 71 and 72 of arm 68 are placed in groove 70 and are snapped into engagement with the reduced diameter portion of pivot pin 64, and at the same time, plate 74 is caused to engage one of the several notches 73 on the periphery of speed cam 65. By selecting one of the several notches 73 formed in cam 65, the relative position of cam 65 and spiral slot 66 is set with respect to arm 68 and knob 60 to thereby set the motor speed range by adjusting the initial tension on speeder spring 21. Thus, arm 68 and speed cam 65 are locked against relative rotation so that they move as a unit assembly. Further, spring arms 71 and 72 act as a lock washer for restricting upward movement of cam 65 and rod 22. A spring washer 75 may be slipped over pivot pin 64 and arranged between platform 55 and cam 65 for urging cam 65 and control rod 22 upwardly against arm 68 to thereby provide a more rigid assembly.

Knob 60 may be fixed to the outer end of arm 68 for manually moving arm 68 and may be formed as a pointer for co-operating with suitable speed indicia which may be inscribed on an escutcheon plate 79 fixed to the front portion of the mixer casing. As knob 60 and cam 65 are rotated clockwise, as viewed in Fig. 4, the control rod 22 is moved forwardly as the lug 61 moves within spiral slot 66 formed in the speed cam 65. This motion extends the governor spring causing it to produce more force which the speed responsive device must overcome, thus increasing the speed setting of the governor.

Figure 5:
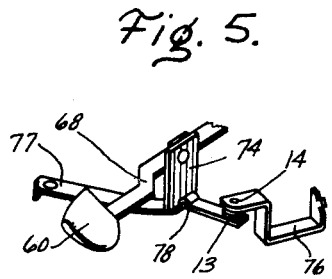
Fig. 5 is a perspective view of the manually operable motor "On" and "Off" switch.

Manually movable arm 68 is also provided for actuating line switch contacts 13 and 14 for turning the mixer on or off. In the arrangement illustrated in Fig. 4, a switch blade bracket 76 may be fixed to insulated platform 55 and contact 14 may be fixed to the underside of blade 76 adjacent to the free end thereof. Contact 13 is fixed to the upper surface of a movable switch blade 77. Switch blade 77 is fixed at one end thereof to platform 55 and is self-biased upwardly so that contacts 13 and 14 are normally closed. Switch blade 77 is also arranged substantially tangentially to disc cam 65 so that rotation of cam 65 can cause the bottom edge of insulated switch actuator plate 74 to slide on the upper surface of blade 77. A hump 78 which acts as a stop for insulated plate 74 is formed in blade 77. Thus, as illustrated in Fig. 5, when arm 68 is rotated counterclockwise until insulated plate 74 abuts hump 78, the governor is at its lowermost speed setting since continued rotation of arm 68 in a counterclockwise direction causes plate 74 to move on hump 78 to thereby depress movable blade 77 to open the line switch contacts 13 and 14 to completely de-energize the motor. It can be seen that plate 74 is formed of insulated material in order to prevent the switch from being grounded through arm 68. Further, the free end portion of fixed switch blade 76 functions as a stop which plate 74 may abut in order to limit counterclockwise rotation of manually adjustable arm 68. Thus, a new and improved single lever arrangement which is simple in construction and may be easily manufactured is provided for adjusting the governor speed setting, and for operating the motor line switch.

*Operation*

Assume that the motor and shaft 4 are at a dead stop with the manually adjustable arm in the "Off" position. In this position, insulated plate 74 is located between hump 78 and switch contact 13, thus biasing movable switch blade 77 downwardly to open line switch contacts 13 and 14, and governor parts will be in the position generally indicated in Fig. 3. When manually movable arm 68 is rotated in a clockwise direction to the position shown in Fig. 1, line switch blade 77 is allowed to move upwardly to close line switch contacts 13 and 14. Closing line switch contacts 13 and 14 supplies power to the motor, and the motor will start to rotate driving motor shaft 4. As the shaft rotates, flyweights 30 move outwardly to move cap 31 rearwardly against movable governor switch blade 20. When the motor reaches a speed such that the force exerted by flyweights 30 on switch blade 20 at the point of attachment of spring 21 to switch blade 20 is greater than the adjusted force of governor speeder spring 21, cap 31 is caused to move further rearwardly to the position shown in Fig. 2 to separate governor contacts 11 and 12, causing the speed of the motor to decrease. When the contacts 11 and 12 are separated, a small amount of current still flows through the motor by means of the impedance comprising resistor 16 and capacitor 17 which may be sufficient to maintain a predetermined minimum speed on the motor. The speed then continues to decrease until the adjusted spring force of governor speeder spring 21 exceeds the force of the flyweights acting at the point of attachment of spring 21 to switch blade 20, then switch blade 20 is caused to move to the left as viewed in Fig. 3 to re-engage contacts 11 and 12 to thereby increase the speed of the motor. This cycle of effectively placing impedance 16, 17 in and out of the motor supply circuit is continually repeated so as to restrict the speed of the motor to a small range extending slightly above and slightly below the speed selected by positioning manually movable arm 68 and knob 60.

Once line contacts 13 and 14 are closed, the speed at which the drive motor rotates is dependent upon the opening and closing of governor contacts 11 and 12. As knob 60 is moved from the "Off" position to the lowermost speed setting position adjacent to hump 78 as illustrated in Fig. 5, and then progressively to the highest speed setting, cam 65 moves rod 22 further and further forwardly. This tensions spring 21 more and more so that it applies an increasingly greater force to switch blade 20 tending to keep contacts 11 and 12 closed to increase the speed setting. Thus, the more spring 22 is tensioned, the higher will be the speed setting of the motor.

While there has been shown and described a particular embodiment of this invention, it will be obvious to those skilled in the art that various other changes and modifications can be made therein without departing from the invention, and therefore, it is aimed in the appended claims to cover all such changes and modifications as fall within the true spirit and scope of the invention.

What we claim as new and desire to secure by Letters Patent of the United States is:

1. In an electric food mixer comprising an electric motor, an adjustable governor at the rear end of the mixer for controlling the speed of the motor, the improvement comprising a control rod having two ends, one end of said rod being connected to the governor for adjusting the speed setting thereof, the other end of the rod having a lug thereon, a platform located at the front end of the mixer, a longitudinal groove formed in said platform for receiving and guiding the lug, and a rotatable disc cam having a spiral cam slot extending therethrough, said lug extending completely through said slot and into said groove, whereby rotation of the disc cam adjusts the longitudinal position of the rod to thereby adjust the governor speed setting.

2. A household mixer comprising an electric motor, two parallel spaced beater spindles, a gear fixexd to each of the beater spindles, said gears being connected to the motor for rotation thereby, an adjustable governor for controlling the speed of the motor, the improvement comprising a gear casing for enclosing the gears, said casing having a generally horizontal top platform and downwardly extenxding side portions, a surface formed on the inside of the top platform for abutting the ends of the beater spindles to form a thrust bearing for the spindles, means for adjusting the governor speed setting including a link having a downwardly extending lug, a longitudinal groove formed on the outside of said platform for receiving and guiding said lug, and cam means for moving said lug in said groove to thereby adjust the governor speed setting.

3. In a household mixer comprising an electric motor, two parallel spaced beater spindles, a gear fixed to each of the spindles, said gears being connected to the motor for rotation thereby, an adjustable governor for controlling the speed of the motor, the improvement comprising a gear casing for enclosing the gears, said casing having a generally horizontal top platform and integrally formed downwardly extending side portions, a transverse projection formed on the inside of said top platform for abutting the ends of the spindles to form a thrust bearing for the spindles, a control rod having two ends, one end of said rod being connected to the governor for adjusting the speed setting thereof, the other end of said rod having a downwardly extending lug, a longitudinal groove formed on the outside of said platform for receiving and guiding said lug, an upstanding pivot pin centrally fixed on the outside of said platform, and cam means mounted for rotation on said pivot pin for moving the lug in said groove to thereby adjust the speed setting of the governor.

4. In a household mixer comprising an electric motor, two parallel spaced beater spindles, a gear fixed to each of the spindles, said gears being connected to said motor for rotation thereby, an adjustable governor for controlling the speed of said motor, the improvement comprising a gear casing for enclosing the gears, said casing having a generally horizontal top platform and integrally formed downwardly extending side portions, a transverse projection formed on the inside of said top platform for abutting the ends of said beater spindles to form a thrust bearing for the spindles, means for adjusting the governor speed setting including a link having a downwardly extending lug, a longitudinal groove formed on the outside of said top platform for receiving and guiding said lug, an upstanding pivot pin centrally fixed on the outside of said top platform, and a flat circular cam disc rotatably mounted on said upstanding pivot pin, said disc being provided with a spiral slot extending through said disc for receiving said lug, whereby rotation of said disc adjusts the position of the spiral slot to move the lug in the groove to thereby adjust the governor speed setting.

5. In a household mixer comprising an electric motor, two parallel spaced beater spindles, a gear fixed to each of the beater spindles, said gears being connected to the motor for rotation thereby, an adjustable governor for controlling the speed of the motor, the improvement comprisng a gear casing for enclosing the gears, said casing having a generally horizontal top platform and integrally formed downwardly extending side portions, a transverse projection formed on the inside of said top platform for abutting the ends of said beater spindles to form a thrust bearing for the spindles, a control rod having two ends, one end of said rod being connected to the governor for adjusting the speed setting thereof, the other end of said rod having a downwardly extending lug, a longitudinal groove formed on the outside of said platform for receiving and guiding said lug, an upstanding pivot pin centrally fixed on the outside of said platform, a slot formed in the other end of said link for receiving said pivot pin, and cam means mounted for rotation on said pivot pin for moving the lug in the groove to thereby adjust the speed setting of the governor.

6. In an electric food mixer comprising an electric motor, an adjustable governor at the rear end of the mixer for controlling the speed of the motor, the improvement comprising a control rod having two ends, one end of said rod being connected to the governor for adjusting the speed setting thereof, the other end of said rod having a lug thereon, a platform located at the front end of the mixer, a longitudinal groove formed in said platform for receiving and guiding the lug, a rotatable disc cam at the front end of the mixer positioned above the platform for actuating the lug, a manually operable arm fixed to said cam, an insulated switch actuator plate fixed to said arm, a pair of circuit breaking contacts for controlling the electrical energy supplied to said motor, a movable switch blade fixed at one end to the platform and having one of said contacts fixed to its other end, the other one of said contacts being fixed to said platform, said movable switch blade being self biased upwardly to maintain said contacts normally closed, said movable blade being so poistioned with respect to said manually operable arm and said switch actuator plate such that rotation of said arm in a predetermined direction causes said cam to decrease the speed setting of said governor and continued rotation of said arm causes said switch actuator plate to engage and depress said movable switch blade to interrupt the electrical energy supplied to said motor.

7. In an electric food mixer comprising an electric motor, an adjustable governor at the rear end of the mixer for controlling the speed of the motor, the improvement comprising a platform located at the front end of the mixer, a rotatable disc cam for adjusting the speed setting of the governor pivoted to said platform, a manually operable arm fixed to said cam and extending radially therefrom, an insulated switch actuator plate fixed to said arm, a pair of normally closed circuit breaking contacts for controlling the electrical energy supplied to said motor, one of said contacts being fixed to said platform at one side thereof, a movable switch blade having one end fixed to said platform, said movable switch blade being positioned on one side of said disc and arranged substantially tangentially thereto, said blade having a hump formed therein, the other contact being fixed to the other end of said switch blade adjacent to said hump, whereby rotation of said arm in a predetermined direction causes said cam to decrease the speed setting of said governor, continued rotation of said arm causes said switch actuator plate to engage said hump, thereby to set the lowermost speed setting of the governor, and continued rotation of said arm moves said switch actuator plate over said hump to depress said movable switch blade to thereby interrupt the electrical energy supplied to said motor.

8. In an electric food mixer comprising an electric motor, an adjustable governor at the rear end of the mixer for controlling the speed of the motor, the improvement comprising a platform located at the front end of the mixer, a rotatable disc cam for adjusting the speed setting of the governor pivoted to said platform, a manually operable arm fixed to said cam and extending radially therefrom, an insulated switch actuator plate fixed to said arm, a pair of normally closed circuit breaking contacts for controlling the electrical energy supplied to said motor, a fixed switch blade connected at one end to the platform and having one of said contacts fixed adjacent to its other end, a movable switch blade having one end fixed to said platform, said movable switch blade being positioned on one side of said disc and arranged substantially tangentially thereto, whereby rotation of said arm in a predetermined direction causes said cam to decrease the speed setting of the governor, continued rotation of the arm causes the insulated switch actuator plate to abut said hump to thereby set the lowermost speed setting of said governor, further rotation of said arm causes said switch actuator plate to move on said hump and depress said movable switch blade to thereby interrupt the electrical energy supplied by said motor, and still further rotation of said manual arm causes the insulated switch actuator plate to abut the other end of said fixed switch blade to thereby limit rotational movement of said cam and manually adjustable arm.

9. In a household mixer comprising an electric motor, two parallel spaced beater spindles, a gear fixed to each of said beater spindles, said gears being connected to said motor for rotation thereby, an adjustable governor for controlling the speed of said motor, the improvement comprising a gear casing for enclosing said gears, said casing having a generally horizontal top platform and integrally formed downwardly extending side portions, a transverse projection formed on the inside of said top platform for abutting the ends of said beater spindles to form a thrust bearing for said spindles, means for adjusting the governor speed setting including a link having a downwardly extending lug, a longitudinal groove formed on the outside of said top platform for receiving and guiding said lug, an upstanding pivot pin centrally fixed on the outside of said top platform, a flat circular cam disc rotatably mounted on said upstanding pivot pin, said disc being provided with a spiral slot extending therethrough for receiving said lug, a manually operable arm, said arm being pivoted to said pivot pin, an insulated switch actuator plate rigidly fixed to said arm, a plurality of speed adjusting notches formed in said disc cam for receiving an edge of said insulated plate which permits the arm and cam to be fixed to each other in any one of several relative positions, a pair of circuit breaking contacts for controlling the electrical energy supplied to said motor, a movable switch blade fixed at one end to the platform and having one of said contacts fixed to its other end, the other one of said contacts being fixed to said platform, said movable switch blade being self-biased upwardly to maintain said contacts normally closed, said movable switch blade being so positioned with respect to said manually operable arm and switch actuator plate such that rotation of said arm in a predetermined direction about said pivot pin causes said disc to move said lug in said groove to decrease the speed setting of said governor and continued rotation of said arm in said predetermined direction causes said switch actuator plate to engage and depress said movable switch blade to interrupt the flow of electrical energy to said motor.

10. In an electric mixer comprising an electric motor, an inverted Y-shaped supporting means having two outwardly extending arms formed integrally with a vertical arm, a movable switch blade connected at one end thereof to said vertical arm, the other end of said switch blade extending downwardly between said two outwardly extending arms, a pair of circuit breaking contacts for controlling the electrical energy supplied to said motor, one of said contacts being fixed to said vertical arm, the other contact being fixed to said switch blade, spring means connected to said switch blade for biasing said contacts to a closed position, and means responsive to the speed of the motor positioned between the two outwardly extending arms for moving the other end of said switch blade, whereby said speed responsive means moves said switch blade to open said contacts in opposition to the force of said spring means upon the motor exceeding the desired speed.

11. In an electric food mixer comprising an electric motor, an inverted Y-shaped supporting means having two outwardly extending arms formed integrally with a vertical arm, a movable switch blade connected at one end thereof to said vertical arm, the other end of said switch blade extending downwardly between said two outwardly extending arms, a pair of circuit breaking contacts in series with said motor for controlling the electrical power supplied to said motor, one of said contacts being fixed to said vertical arm, the other contact being fixed to said movable switch blade, spring means connected to said switch blade for biasing said contacts to a closed position, a resistor connected in series with said motor and in parallel with said pair of contacts, said resistor being mounted on said Y-shaped supporting means between the two outwardly extending arms thereof, and means responsive to the speed of the motor positioned between said two outwardly extending arms for moving the other end of said switch blade whereby said speed responsive means opens said contacts in opposition to the force of said spring means when the motor exceeds the desired speed.

12. In an electric food mixer comprising an electric motor, an inverted Y-shaped supporting means having two outwardly extending arms formed integrally with a vertical arm, a switch blade connected at one end thereof to said vertical arm, the other end of said blade extending downwardly between said two outwardly extending arms, a pair of circuit breaking contacts for controlling the electrical power supplied to said motor, one of said contacts being fixed to said vertical arm, the other contact being fixed to said switch blade, a governor speeder spring, one end of said speeder spring being connected to said switch blade for urging said contacts closed, a link extending from the front end of the mixer to the rear end of the mixer, the other end of said speeder spring being connected to said link, means located at the front end of the mixer for longitudinally adjusting the position of the link to thereby vary the tension of said speeder spring, and means responsive to the speed of the motor positioned between said two outwardly extending arms for moving the other end of said switch blade whereby said speed responsive means opens said contacts in opposition to the force of said speeder spring upon the motor exceeding the desired speed.

13. In an electric mixer comprising an electric motor, the improvement comprising an inverted Y-shaped supporting means having two outwardly extending arms formed integrally with a vertical arm, a switch blade having two ends, a conducting hinge connecting one end of said switch blade to said vertical arm, the other end of said switch blade extending downwardly said outwardly extending arms, a pair of circuit breaking contacts for controlling the electrical energy supplied to said motor, one of said contacts being fixed to said vertical arm, the other contact being fixed to said switch blade, spring means connected to said switch blade for biasing said contacts to a closed position, and means responsive to the speed of the motor positioned between the two outwardly extending arms for moving the other end of said switch blade, whereby said speed responsive means moves said switch blade to open said contacts in opposition to the force of said spring means upon the motor exceeding the desired speed.

14. In an electric mixer comprising an electric motor, the improvement comprising an inverted Y-shaped supporting means having two outwardly extending arms formed integrally with a vertical arm, a movable switch blade connected at one end thereof to said vertical arm, the other end of said switch blade extending downwardly between said two outwardly extending arms, a pair of circuit breaking contacts for controlling the electrical energy supplied to said motor, one of said contacts being fixed to said vertical arm, the other contact being fixed to said switch blade, spring means connected to said switch blade for biasing said contacts to a closed position, and means responsive to the speed of the motor positioned between said two outwardly extending arms for moving the other end of said switch blade, pin stop means extending from one of said outwardly extending arms to the other outwardly extending arm to thereby limit movement of said movable switch blade, whereby said speed responsive means moves said switch blade to open said contacts in opposition to the force of said spring means on the motor exceeding the desired speed.

15. In an electric food mixer comprising an electric motor having a power supply circuit, an inverted Y-shaped supporting means having two outwardly extending arms formed integrally with a vertical arm, a movable switch blade connected at one end to said vertical arm, the other end of said switch blade extending downwardly between said two outwardly extending arms, a pair of governor contacts in the circuit leading to the motor for controlling the electrical power supplied to said motor, one of said governor contacts being fixed to said vertical arm, the other governor contact being fixed to said switch blade, a governor speeder spring, one end of said speeder spring being connected to said switch blade for urging said contacts closed, a link extending from the front end of the mixer to the rear end of the mixer, the other end of said speeder spring being connected to said link, a cam located at the front end of the mixer for longitudinally adjusting the position of the link to thereby vary the tension of said speeder spring, a line switch located at the front end of the mixer connected in electrical series with the motor and said governing switch contacts, a manually operable arm fixed to said cam, an insulated switch actuator plate fixed to said arm for actuating said line switch, said line switch being positioned with respect to said cam and arm such that movement of said arm in a predetermined direction causes said cam to decrease the speed setting of the governor and continued rotation of said arm causes said line switch actuator plate to engage and open said line switch.

References Cited in the file of this patent

UNITED STATES PATENTS

| | | |
|---|---|---|
| 2,368,897 | Strauss et al. | Feb. 6, 1945 |
| 2,557,765 | Robertson | June 19, 1951 |
| 2,719,945 | Tull | Oct. 4, 1955 |
| 2,737,603 | Gerry | Mar. 6, 1956 |